United States Patent
Kinoshita et al.

(10) Patent No.: US 7,936,093 B2
(45) Date of Patent: May 3, 2011

(54) PHASE CONTROL SWITCHING DEVICE

(75) Inventors: Sadayuki Kinoshita, Tokyo (JP); Kenji Kamei, Tokyo (JP); Haruhiko Koyama, Tokyo (JP); Tomohito Mori, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 152 days.

(21) Appl. No.: 12/515,495

(22) PCT Filed: Feb. 15, 2007

(86) PCT No.: PCT/JP2007/052775
§ 371 (c)(1),
(2), (4) Date: May 19, 2009

(87) PCT Pub. No.: WO2008/099495
PCT Pub. Date: Aug. 21, 2008

(65) Prior Publication Data
US 2010/0072828 A1    Mar. 25, 2010

(51) Int. Cl.
*H01H 47/00* (2006.01)
(52) U.S. Cl. .................. 307/127; 307/116; 307/125
(58) Field of Classification Search .................. 307/116, 307/125, 127
See application file for complete search history.

(56) References Cited

U.S. PATENT DOCUMENTS

| | | | | |
|---|---|---|---|---|
| 5,838,077 A | * | 11/1998 | Chelcun et al. | ............... 307/125 |
| 6,114,778 A | * | 9/2000 | Rostron et al. | ................ 307/116 |
| 6,392,390 B1 | | 5/2002 | Ito et al. | |
| 6,433,980 B1 | | 8/2002 | Tsutada et al. | |
| 7,259,947 B2 | * | 8/2007 | Kinoshita et al. | ............... 361/85 |
| 7,696,648 B2 | * | 4/2010 | Kinoshita et al. | ............ 307/125 |

FOREIGN PATENT DOCUMENTS

| | | |
|---|---|---|
| JP | 62-88227 A | 4/1987 |
| JP | 3-156820 | 7/1991 |
| JP | 2001-135205 A | 5/2001 |
| JP | 2003-168335 A | 6/2003 |
| JP | 2004-349001 A | 12/2004 |
| JP | 2006-324125 A | 11/2006 |
| WO | WO 00/04564 A1 | 1/2000 |

OTHER PUBLICATIONS

International Search Report (PCT/ISA/210) dated May 15, 2007.
Written Opinion (PCT/ISA/210) dated May 15, 2007.
Decision of a Patent Grant in corresponding JP application issued Feb. 25, 2011, and English-language translation, 3 pages.

\* cited by examiner

*Primary Examiner* — Fritz M Fleming
(74) *Attorney, Agent, or Firm* — Buchanan Ingersoll & Rooney PC

(57) ABSTRACT

In a phase control switching device that controls a closing phase of a three-phase switching device connected between a power-supply-side transmission line and a compensation transmission line having a shunt reactor, a closing-phase control unit operates based on a closing command to the three-phase switching device, generates, for each phase, a closing phase in which the three-phase switching device is closed at zero points, both polarities of which are inverted into the same polarity, among zero points where zero points of a voltage changing ratio and zero points of the shunt reactor current coincide with each other, and controls the three-phase switching device.

3 Claims, 2 Drawing Sheets

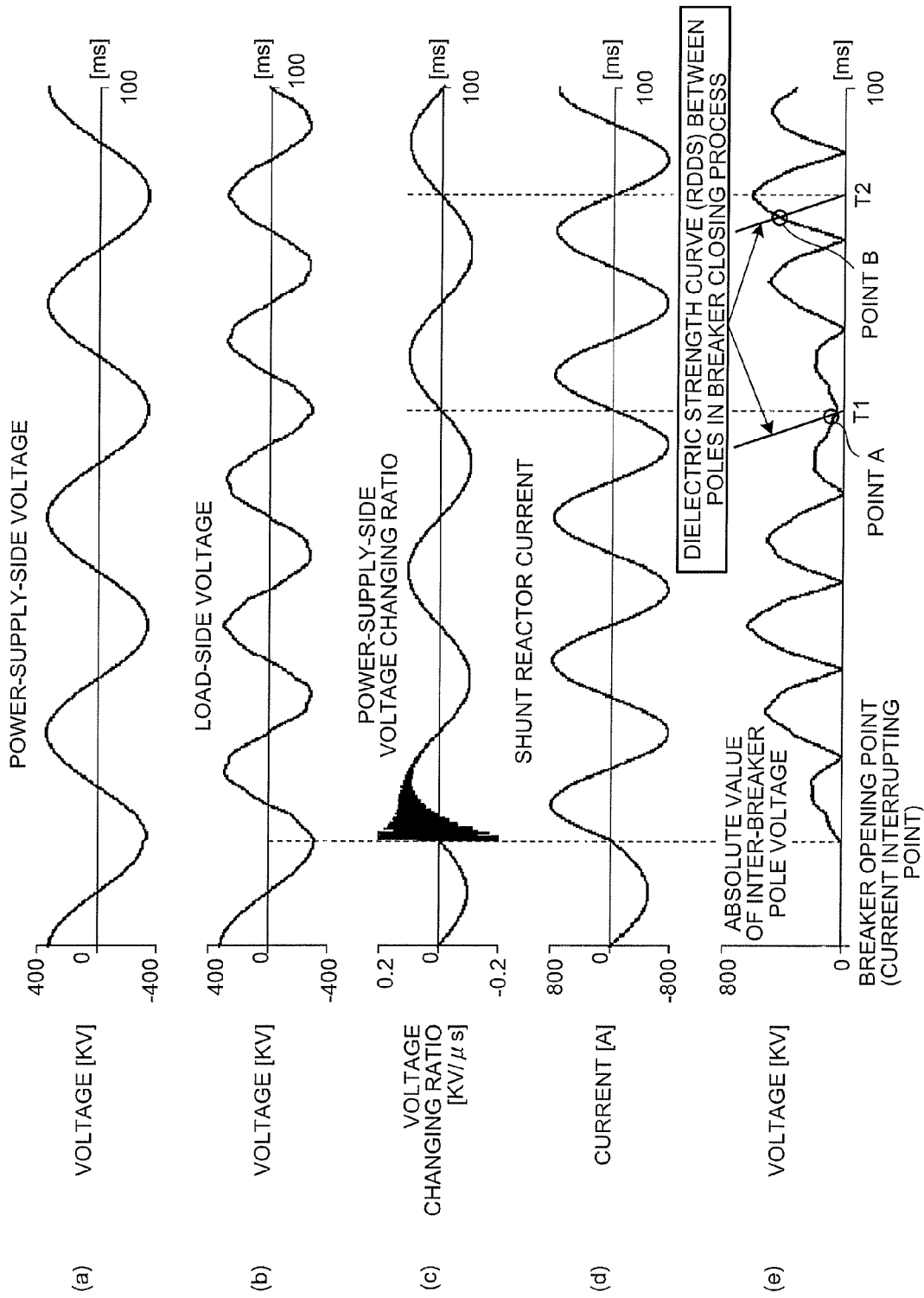

PHASE CONTROL SWITCHING DEVICE

TECHNICAL FIELD

The present invention relates to a phase control switching device that controls switching timing of a power switching device in an optimum phase such that a switching surge is minimized.

BACKGROUND ART

Conventionally, there is a phase control switching device that, when power is applied to a three-phase no-load transmission line, measures power supply voltages of the respective phases, detects power-supply-voltage zero points in each of the phases, and individually closes breakers for the respective phases near the detected power-supply-voltage zero points to thereby suppress generation of transient voltage and current (e.g., Patent Document 1).

Patent Document 1: Japanese Republication of PCT International Application WO00/004564 (pp. 28-29, FIGS. 1 and 3)

DISCLOSURE OF INVENTION

Problem to be Solved by the Invention

In general, it is known that, when a no-load transmission line is interrupted, various voltages are generated not only on a power supply side of a breaker but also on a load side of the breaker according to a condition on the transmission line side. For example, when a compensation transmission line having a shunt reactor is connected to the load side, a sine wave voltage having a fixed frequency is generated on the load side.

Under such a situation, to suppress an overvoltage when the breaker is closed again, it is necessary to close the breaker at timing when a difference between a power-supply-side voltage and a load-side voltage is minimized (i.e., timing when the voltage between breaker poles in a voltage waveform formed by combining the power-supply-side voltage and the load-side voltage appear is minimized).

However, in a conventional phase control switching device represented by Patent Document 1 or the like, closing phase control for the breaker is performed with attention paid only to a zero point of a power supply voltage in each of the phases and a zero point of each of inter-phase voltages. Therefore, when an unexpected voltage waveform is generated on the load side as explained above, there is a problem in that transient voltage and current at the time of closing the breaker may not be suppressed.

The present invention has been made in view of the above and it is an object of the present invention to provide a closing phase control device capable of suppressing transient voltage and current at the time of closing the breaker regardless of a state of load-side voltage.

Means for Solving Problem

To solve the above problems and to achieve the above objects, a phase control switching device according to the present invention controls a closing phase of a three-phase switching device connected between a power-supply-side transmission line and a compensation transmission line having a shunt reactor. The phase control switching device includes a voltage measuring unit that measures each phase voltage in the power-supply-side transmission line; a voltage-changing-ratio zero-point-period detecting unit that detects a period of zero points of each phase voltage changing ratio obtained by a time derivative of the phase voltage measured by the voltage measuring unit; a current measuring unit that measures each phase current flowing to the shunt reactor inserted for each phase of the compensation transmission line; a current-zero-point-period detecting unit that detects a period of zero points of the phase current measured by the current measuring unit; and a closing-phase control unit that operates based on a closing command to the three-phase switching device, generates, for each phase, a closing phase in which the three-phase switching device is closed at zero points, both polarities of which are inverted into same polarity, among zero points where zero points of the voltage changing ratio and zero points of the shunt reactor current coincide with each other, and controls the three-phase switching device.

Effect of the Invention

The phase control switching device according to the present invention generates, for each of phases, a closing phase in which the breaker is closed at zero points, both polarities of which are inverted into the same polarity, among zero points where zero points of a voltage changing ratio obtained by the time derivative of respective phase voltages measured by the voltage measuring unit and zero points of a shunt reactor current measured by the current measuring unit coincide with each other and controls the breaker. Therefore, there is an effect that this makes it possible to suppress transient voltage and current at the time of closing the breaker regardless of a state of the voltage on a compensation transmission line side.

BRIEF DESCRIPTION OF DRAWINGS

FIG. 2 is a waveform chart for explaining operations of the phase control switching device shown in FIG. 1.

Figure 1:
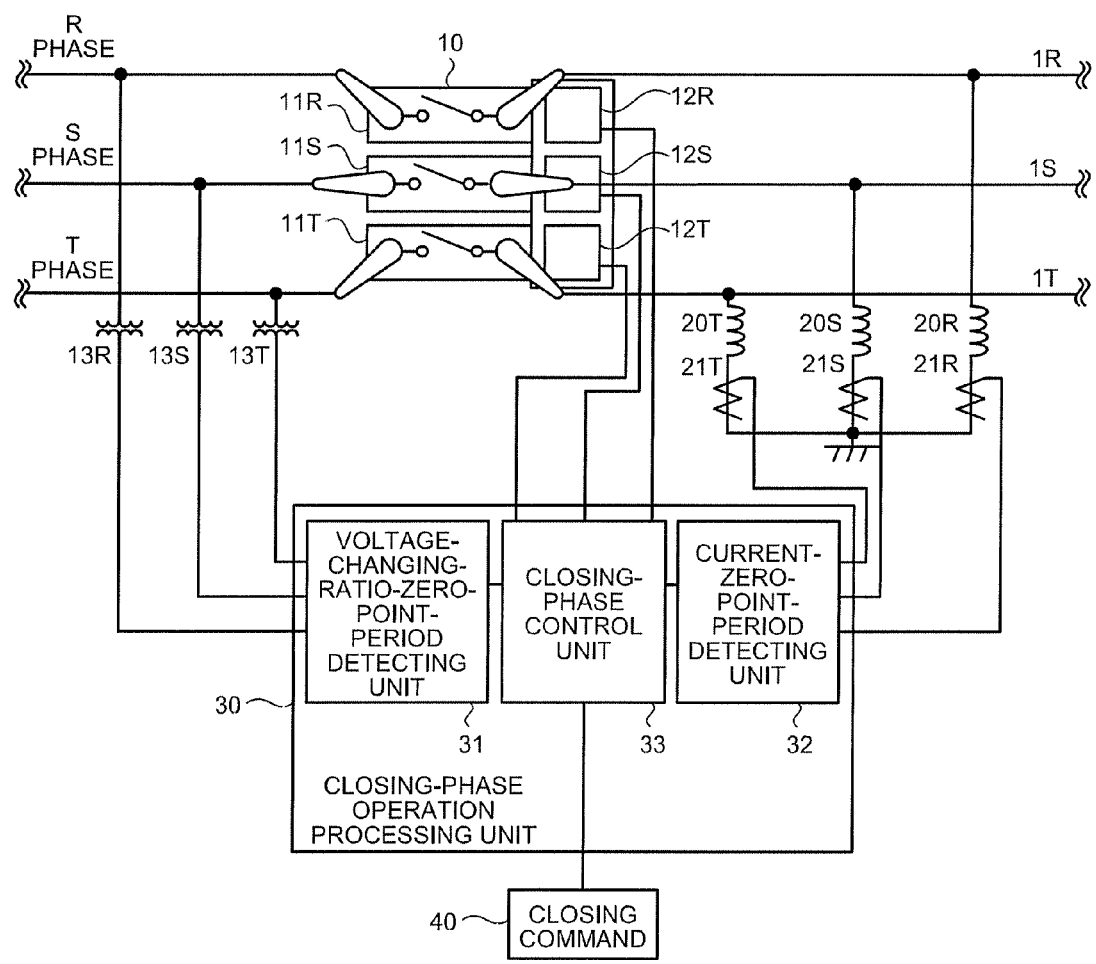
FIG. 1 is a schematic diagram for explaining an exemplary embodiment of a phase control switching device according to the present invention.

EXPLANATIONS OF LETTERS OR NUMERALS 1R, 1S, 1T transmission lines
10 breaker
11R, 11S, 11T arc extinguishing chambers
12R, 12S, 12T operation units
13R, 13S, 13T voltage measuring units
20R, 20S, 20T shunt reactors
21R, 21S, 21T current measuring units
30 closing-phase operation processing unit
31 voltage-changing-ratio zero-point-period detecting unit
32 current-zero-point-period detecting unit
33 closing phase control unit
40 closing command

BEST MODE(S) FOR CARRYING OUT THE INVENTION

Exemplary embodiments of a phase control switching device according to the present invention are explained below in detail with reference to the drawings. The present invention is not limited by the embodiments explained below.

(Characteristics of the Present Invention)

It is an object of the present invention to provide a closing phase control device that makes it possible to suppress transient voltage and current at the time when a breaker is closed regardless of a state of load-side voltage. The present invention can solve problems that the conventional technical ideas cannot solve. The present invention is characterized in that it is always possible to close a breaker at timing when an inter-breaker pole voltage is low by taking into account a dielectric strength characteristic (RDDS) between breaker poles in a breaker closing process.

(Configuration of the Device)

An exemplary embodiment of the phase control switching device according to the present invention is explained. FIG. 1 is a schematic diagram for explaining the exemplary embodiment of the phase control switching device according to the present invention. In FIG. 1, a breaker 10 as a three-phase switching device is connected between a power-supply-side circuit shown on the left side of the figure and transmission lines 1R, 1S, and 1T shown on the right side of the figure. The breaker 10 includes arc extinguishing chambers 11R, 11S, and 11T and also includes operation units 12R, 12S, and 12T independent for respective phases to allow respective contacts provided in the arc extinguishing chambers 11R, 11S, and 11T to open and close independently from one another. Voltage measuring units 13R, 13S, and 13T for measuring power-supply-side voltages in respective phases are provided on a power supply side of the breaker 10. On the other hand, current measuring units 21R, 21S, and 21T for measuring electric currents flowing to shunt reactors 20R, 20S, and 20T provided for the respective phases are provided on a transmission line side of the breaker 10.

A closing-phase operation processing unit 30 is a unit that has a function of performing operation processing including closing phase control and can be, for example, a microcomputer or a control processor. The closing-phase operation processing unit 30 includes a voltage-changing-ratio zero-point-period detecting unit 31 that operates based on outputs from the voltage measuring units 13R, 13S, and 13T, a current-zero-point-period detecting unit 32 that operates based on outputs from the current measuring units 21R, 21S, and 21T, and a closing-phase control unit 33 that operates based on outputs from these units (the voltage-changing-ratio zero-point-period detecting unit 31 and the current-zero-point-period detecting unit 32) and a closing command 40 input to the closing-phase operation processing unit 30.

(Operations of the Device)

Operations of the phase control switching device shown in FIG. 1 are explained with reference to FIG. 2. FIG. 2 is a waveform chart for explaining the operations of the phase control switching device. In the following explanation of the operations, first, waveform charts shown in FIG. 2 are explained and then operations of the closing-phase control unit 33 for calculating a closing phase are explained based on the waveform charts shown in FIG. 2. Actual operations are performed for each of phases. However, for simplification of the explanation, only operations for one phase (an R phase) are explained and explanation of operations in other phases is omitted.

(a) to (e) in FIG. 2 are diagrams of examples of waveforms of the respective units at the time when the breaker 10 is opened at a breaker opening point indicated by a wavy line part. More specifically, in (a) in FIG. 2, a power-supply-side voltage waveform output from the voltage measuring unit 13R is shown. In (b) in FIG. 2, a transmission-line-side voltage waveform is shown. (c) in FIG. 2 is a waveform indicating a changing ratio of a power-supply-side voltage obtained by the time derivative of a power-supply-side voltage output from the voltage measuring unit 13R and input to the voltage-changing-ratio zero-point-period detecting unit 31. (d) in FIG. 2 is a waveform of a shunt reactor current output from the current measuring unit 21R and input to the current-zero-point-period detecting unit 32. (e) in FIG. 2 is a waveform indicating an absolute value of voltage appearing between the poles after the breaker 10 is opened.

In the present embodiment, control is performed to set, as a target phase for closing, a phase of zero points, both polarities of which are inverted in the same polarity, (zero points, both polarities of which are inverted from a negative polarity to a positive polarity, or zero points, both polarities of which are inverted from a positive polarity to a negative polarity) among zero points where zero points on the waveform of the voltage changing ratio of the power-supply-side voltage (see (c) in FIG. 2) and zero points of the shunt reactor current (see (d) in FIG. 2) coincide with each other.

Operations performed when a dielectric strength characteristic (RDDS) between the poles included in the breaker 10 is taken into account are explained.

A T1 point and a T2 point shown on the waveform in (e) in FIG. 2 are shown as mechanical closing points where the poles of the breaker 10 mechanically come into contact with each other. Straight lines extending from the T1 point and the T2 point to the upper left indicate dielectric strength characteristics (RDDS) between the poles in a breaker closing process, i.e., inter-pole dielectric strengths obtained when the breaker is operated to mechanically close the poles at the T1 point and the T2 point, respectively. Therefore, a point A and a point B as intersections of these straight lines and the waveform in (e) in FIG. 2 mean electric closing points where the poles electrically come into contact with each other at points before the closing points where the poles mechanically come into contact.

On the other hand, as shown in (c) and (d) in FIG. 2, the voltage changing ratio of the power-supply-side voltage and the shunt reactor current have waveforms of a substantial sine wave having zero as a base line. There are about two kinds of points where zero points of the voltage changing ratio and the shunt reactor current coincide with each other. In the zero points, there are a phase point T1 where both polarities thereof are inverted into the same polarity (inverted from a negative polarity to a positive polarity) and a phase point T2 where both polarities thereof are inverted into opposite polarities (inverted from a negative polarity to a positive polarity in (c) in FIG. 2 and inverted from a positive polarity to negative a polarity in (d) in FIG. 2).

On the other hand, at the point A and the point B as the electric closing points, positions on the abscissa of the respective points indicate closing phases in closing the breaker and positions on the ordinate indicate the magnitude of inter-pole applied voltage at the time when insulation between the poles is broken. Because the magnitude of this inter-pole applied voltage is an initial value of a transient phenomenon started by closing the breaker, the influence on a power system and the like is larger as this inter-pole applied voltage is larger. Therefore, in the example shown in FIG. 2, it is necessary to perform control for selecting the point A where the inter-pole applied voltage is small as the electric closing point. If such a technical idea is explained as a control form in the phase control switching device shown in FIG. 1, the control form is as explained below.

The closing-phase operation processing unit 30 only needs to select, among zero points where zero points in a voltage changing ratio of a power-supply-side voltage detected by the voltage-changing-ratio zero-point-period detecting unit 31 and zero points of a load-side current detected by the current-zero-point-period detecting unit 32 coincide with each other, zero points, before and after which both polarities of amplitude values are inverted into the same polarity, and output, to the breaker 10, a closing phase in which the selected zero points are closing points to the breaker 10. According to such control, electric contact in the breaker 10 is performed at an electric closing point where inter-electrode voltage has a lower voltage value. Therefore, there is an effect that it is possible to suppress transient voltage and current at the time of closing the breaker regardless of a state of load-side voltage.

As explained above, the phase control switching device according to this embodiment generates, for each of phases, a closing phase in which the breaker is closed at zero points, both polarities of which are inverted into the same polarity, among zero points where zero points of a voltage changing ratio obtained by the time derivative of measured respective phase voltages and zero points of a measured shunt reactor current coincide with each other and controls the breaker. Therefore, it is possible to suppress transient voltage and current at the time of closing the breaker regardless of a state of the voltage on a compensation transmission line side.

In the explanation of the above embodiment, it is assumed that zero points in a voltage changing ratio of a power-supply-side voltage detected by the voltage-changing-ratio zero-point-period detecting unit 31 and zero points of a load-side current detected by the current-zero-point-period detecting unit 32 coincide with each other. Actually, the shunt reactors 20R, 20S, and 20T are circuit elements having only reactor (inductive reactor) components. Therefore, it is possible to process these zero points assuming that the zero points coincide with each other.

On the other hand, it is also conceivable that, depending on characteristics of the shunt reactors 20R, 20S, and 20T and detection accuracies of the voltage-changing-ratio zero-point-period detecting unit 31 and the current-zero-point-period detecting unit 32, detected zero points do not coincide with each other in a strict sense. However, even in such a case, control only has to be performed with reference to one of zero points in a voltage changing ratio of a power-supply-side voltage and zero points of a load-side current that satisfy the control form. Even if such control is performed, it is possible to attain the object of the present invention of suppressing transient voltage and current at the time of closing the breaker.

In this embodiment, the voltage-changing-ratio zero-point-period detecting unit 31 is explained as the unit that detects a zero point period of a voltage changing ratio. However, it goes without saying that the voltage-changing-ratio zero-point-period detecting unit 31 can be a unit that directly detects zero points per se without detecting a zero point period. Similarly, the current-zero-point-period detecting unit 32 can be a unit that directly detects current zero points per se without detecting a period of current zero points.

Industrial Applicability

As explained above, the phase control switching device according to the present invention is useful as an invention that can contribute to control of transient voltage and current at the time of closing the breaker regardless of a state of voltage on a compensation transmission line side.

The invention claimed is:

1. A phase control switching device that controls a closing phase of a three-phase switching device connected between a power-supply-side transmission line and a compensation transmission line having a shunt reactor, the phase control switching device comprising:
    a voltage measuring unit that measures each phase voltage in the power-supply-side transmission line;
    a voltage-changing-ratio zero-point-period detecting unit that detects a period of zero points of each phase voltage changing ratio obtained by a time derivative of the phase voltage measured by the voltage measuring unit;
    a current measuring unit that measures each phase current flowing to the shunt reactor inserted for each phase of the compensation transmission line;
    a current-zero-point-period detecting unit that detects a period of zero points of the phase current measured by the current measuring unit; and
    a closing-phase control unit that operates based on a closing command to the three-phase switching device, generates, for each phase, a closing phase in which the three-phase switching device is closed at zero points, both polarities of which are inverted into same polarity, among zero points where zero points of the voltage changing ratio and zero points of the shunt reactor current coincide with each other, and controls the three-phase switching device.

2. The phase control switching device according to claim 1, wherein the closing phase generated by the closing-phase control unit is generated with reference to the zero points of the voltage changing ratio.

3. The phase control switching device according to claim 1, wherein the closing phase generated by the closing-phase control unit is generated with reference to the zero points of the shunt reactor current.

* * * * *